US008587852B2

(12) United States Patent
Nakamura (10) Patent No.: US 8,587,852 B2
(45) Date of Patent: Nov. 19, 2013

(54) GENERATION OF A HOLOGRAM PATTERN (75) Inventor: Fusashi Nakamura, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1865 days.

(21) Appl. No.: 10/910,670

(22) Filed: Aug. 3, 2004

(65) Prior Publication Data

US 2005/0057787 A1     Mar. 17, 2005

(30) Foreign Application Priority Data

Aug. 8, 2003 (JP) ................................ 2003-290921

(51) Int. Cl.
*G03H 1/08* (2006.01)
*G03H 1/22* (2006.01)

(52) U.S. Cl.
USPC ..................................... 359/9; 359/1; 359/32

(58) Field of Classification Search
USPC ................................................ 359/9, 23, 15
See application file for complete search history.

(56) References Cited

U.S. PATENT DOCUMENTS 5,852,504 A * 12/1998 Kato et al. ........................ 359/9
6,873,444 B1 * 3/2005 Guletsky et al. .................. 359/9

OTHER PUBLICATIONS

Matsushima, Kyoji and Masahiro Takai, "Recurrence Formulas for Fast Creation of Synthetic Three-Dimensional Holograms," Applied Optics, vol. 39, No. 35, Dec. 10, 2000.
Nishikawa, Osamu and Takatasune Okada, "High-Speed Holographic-Stereogram Calculation Method Using 2DFFT," SPIE, vol. 3010.

* cited by examiner

*Primary Examiner* — Audrey Y Chang
(74) *Attorney, Agent, or Firm* — Anne Vachon Dougherty (57) ABSTRACT

Device for generating a hologram pattern including: selecting means for selecting, as cross section ranges which are in a plurality of cross sections parallel to hologram pattern in 3D object and which are ranges used for generating hologram pattern, cross section ranges which overlap ranges in other cross sections when the relevant cross section is perspectively seen from a predetermined observation point on the hologram pattern; depth integrating means for calculating, for lattice points in one cross section range, a depth integral function acquired by integrating an inverse diffraction function for determining hologram pattern for displaying points of 3D object with respect to respective lattice points in the cross section ranges which overlap the relevant lattice point; and inverse Fourier transform means for generating hologram pattern by performing two-dimensional inverse transform on depth integral functions with respect to plurality of lattice points in one cross section range.

11 Claims, 6 Drawing Sheets

GENERATION OF A HOLOGRAM PATTERN

FIELD OF THE INVENTION

The present invention relates to a generation device, a generation method, a program, and a recording medium for generating a hologram pattern. It also relates to generating a hologram pattern using a computer, wherein the hologram pattern displays a 3D object based on the 3D object to be displayed.

BACKGROUND OF THE INVENTION

Heretofore, holography technology capable of causing an observer to perceive a three-dimensional object has been used. Since holography technology does not require a special device and the like and can cause an observer to intuitively and correctly perceive a 3D object without imposing a strain on the eye of the observer, holography technology has a wide range of applications. For example, holography technology is used in the fields of exhibition, advertisement, medical care, education, entertainment, and the like.

Figure 6:
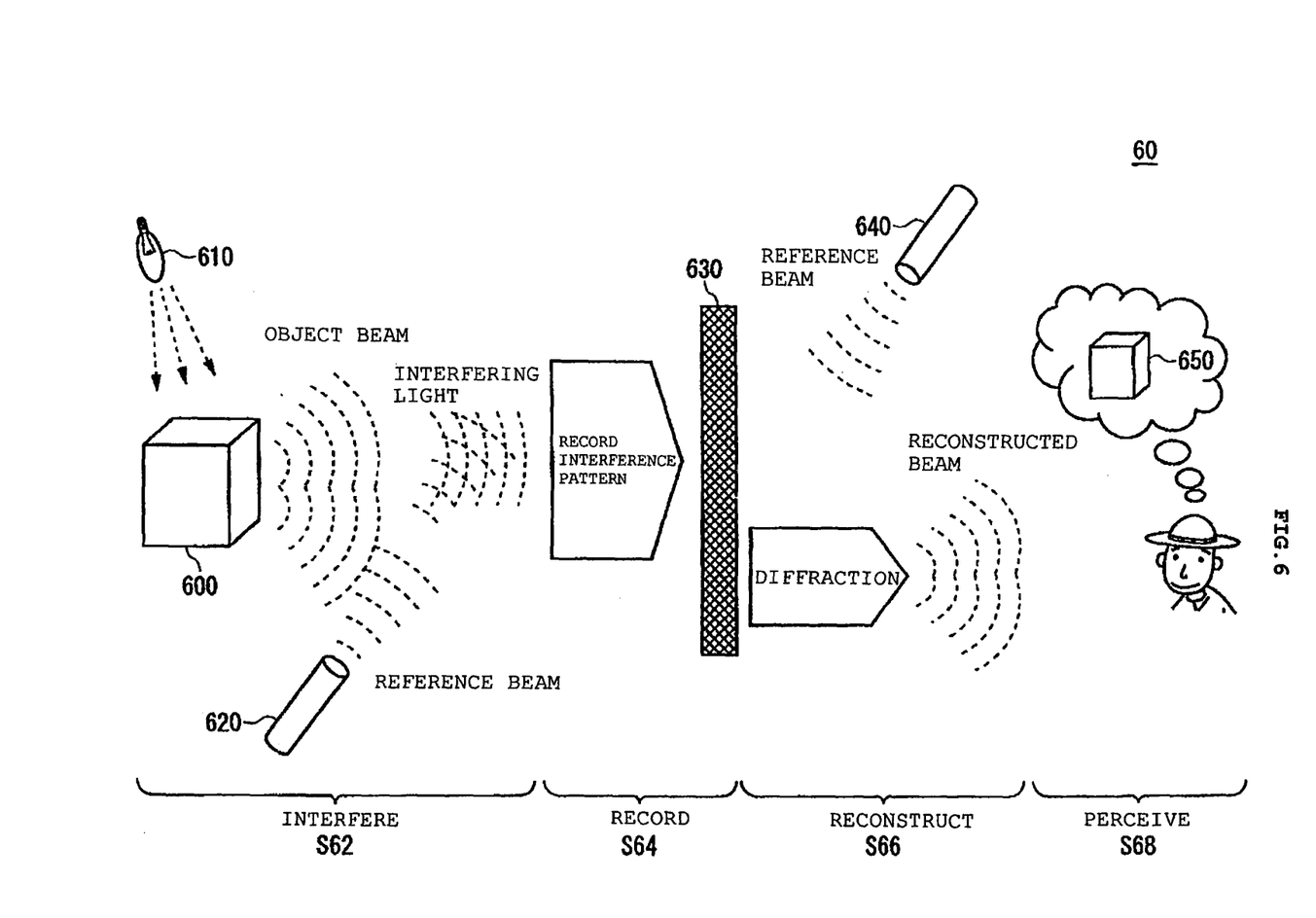
FIG. 6 shows an example in which a hologram pattern is optically generated.

The principle of holography technology will be described. FIG. 6 shows an example of a hologram optical generation system 60 for optically generating a hologram pattern. The hologram optical generation system 60 includes a lighting fixture 610, a light-emitting device 620, a hologram 630, and a light-emitting device 640. First, the hologram optical generation system 60 performs the processing below in order to generate the interference of light (S62). The lighting fixture 610 irradiates light to an object 600 to be displayed. The object 600 reflects the light irradiated from the lighting fixture 610 as an object beam onto the hologram 630. The light-emitting device 620 irradiates a reference beam to the hologram 630. Thus, interfering light in which the object and reference beams interfere with each other is generated.

The hologram 630 records the wavelength and phase of the interfering light generated in S62 as an interference pattern (S64). For example, the hologram 630 is a predetermined optical film and is exposed to the interfering light to record the wavelength and phase of the interfering light. The light-emitting device 640 irradiates the reference beam to the hologram 630 (S66). The hologram 630 diffracts the reference beam irradiated from the light-emitting device 640 with the interference pattern and reflects the reference beam as a reconstructed beam toward an observer. The observer perceives the wavelength and phase of light recorded on the hologram 630 by observing the reconstructed beam (S68). Thus, the observer can perceive a 3D object 650, which is the same as the object 600.

In what follows, consideration is given to the following documents:

Non-patent Literature 1) High-Speed Holographic-Stereogram Calculation Method Using 2D FFT, SPIE, Vol. 3010, p 49

Non-patent Literature 2) Recurrence formulas for fast creation of synthetic three-dimensional hologram, Applied Optics, Vol. 39, No. 35, p 6587

Moreover, in recent years, with the progress of computers and the trend toward higher definitions of LCD panels, a method of generating a hologram pattern using a computer to display the hologram pattern using an LCD panel is receiving attention (e.g., refer to Non-patent Literature 1 and Non-patent Literature 2). Known methods are divided into, for example, the following two groups:

Method 1

An object is regarded as a set of point light sources. Then, for each point light source, Fresnel-Kirchhoff integral, which determines a light wave coming from the point light source, is calculated.

Method 2

For each of cross sections when an object is divided into planes perpendicular to the depth direction, a diffraction pattern, e.g., a Fraunhofer diffraction pattern, a Fresnel diffraction pattern, or a Fourier diffraction pattern, generated by light coming from the relevant cross section, is integrated in the depth direction.

In general, optically manufacturing a hologram pattern requires various equipment, e.g., a device for generating a predetermined reference beam, a film for recording an interference pattern, a darkroom for exposing a hologram, and the like. In particular, optically manufacturing a hologram for reconstructing a moving image requires enormous cost and time.

Moreover, a known method of electronically generating a hologram also requires enormous computation time. For example, in a known two-dimensional image, each pixel is related to each portion of an object to be displayed. On the other hand, each pixel of a hologram pattern needs to record interfering light of a light wave coming from the entire object to be displayed. Accordingly, the creation of a hologram pattern requires more calculations compared with the case where general three-dimensional computer graphics are generated.

For example, according to the above-described Method 1, the computation time required for the creation of a hologram is proportional to the product of the number of pixels of the hologram, the number of point light sources, and the computation time in which one point light source determines one pixel. In the case where a moving image is created by this method using a computer, computing performance as high as several petaflops is required. On the other hand, according to Method 2, computation time is proportional to the product of the computation time for determining a hologram pattern from one cross section and the number of cross sections. This method also requires computing performance of approximately 100 gigaflops to 1 teraflops.

SUMMARY OF THE INVENTION

In order to solve the above problems, a first aspect of the present invention provides a generation device for generating a hologram pattern for displaying a 3D object based on the 3D object to be displayed, the generation device including: selecting means for selecting, as a cross section range in each cross section of a plurality of cross sections into which the 3D object is divided and which are parallel to the hologram pattern, the cross section range to be used for generating the hologram pattern, a cross section range overlapping cross section ranges in other cross sections in a case where the relevant cross section is perspectively seen from a previously determined observation point on the hologram pattern; depth integrating means for calculating, for each of a plurality of lattice points in a coordinate system provided in one cross section range, a depth integral function acquired by integrating an inverse diffraction function for determining a hologram pattern for displaying points of the 3D object, with respect to respective lattice points in the plurality of cross section ranges, the respective lattice points overlapping the relevant lattice point in a case where the plurality of cross section ranges are perspectively seen from the observation point; and inverse Fourier transform means for generating the hologram pattern by performing a two-dimensional inverse Fourier transform on the depth integral functions with respect to the plurality of lattice points in the one cross section range, a generation method using the generation device, a program for causing a computer to function as the generation device, and a recording medium having the program recorded thereon.

Note that the above-described summary of the invention does not list all features necessary for the present invention and that subcombinations of these features can be also included in the present invention.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

The present invention provides generation devices, methods and apparatus for generating a hologram pattern for displaying a 3D object based on the 3D object to be displayed. An example of a generation device includes: selecting means for selecting, as a cross section range in each cross section of a plurality of cross sections into which the 3D object is divided and which are parallel to the hologram pattern, the cross section range to be used for generating the hologram pattern, a cross section range overlapping cross section ranges in other cross sections in a case where the relevant cross section is perspectively seen from a previously determined observation point on the hologram pattern; depth integrating means for calculating, for each of a plurality of lattice points in a coordinate system provided in one cross section range, a depth integral function acquired by integrating an inverse diffraction function for determining a hologram pattern for displaying points of the 3D object, with respect to respective lattice points in the plurality of cross section ranges, the respective lattice points overlapping the relevant lattice point in a case where the plurality of cross section ranges are perspectively seen from the observation point; and inverse Fourier transform means for generating the hologram pattern by performing a two-dimensional inverse Fourier transform on the depth integral functions with respect to the plurality of lattice points in the one cross section range, a generation method using the generation device, a program for causing a computer to function as the generation device, and a recording medium having the program recorded thereon.

Hereinafter, the present invention will be described by way of advantageous embodiments. However, the embodiments below are not intended to limit the invention commensurate with the scope of the claims, and all combinations of the features described in the embodiment are not necessarily indispensable for solving means of the invention.

Figure 1:
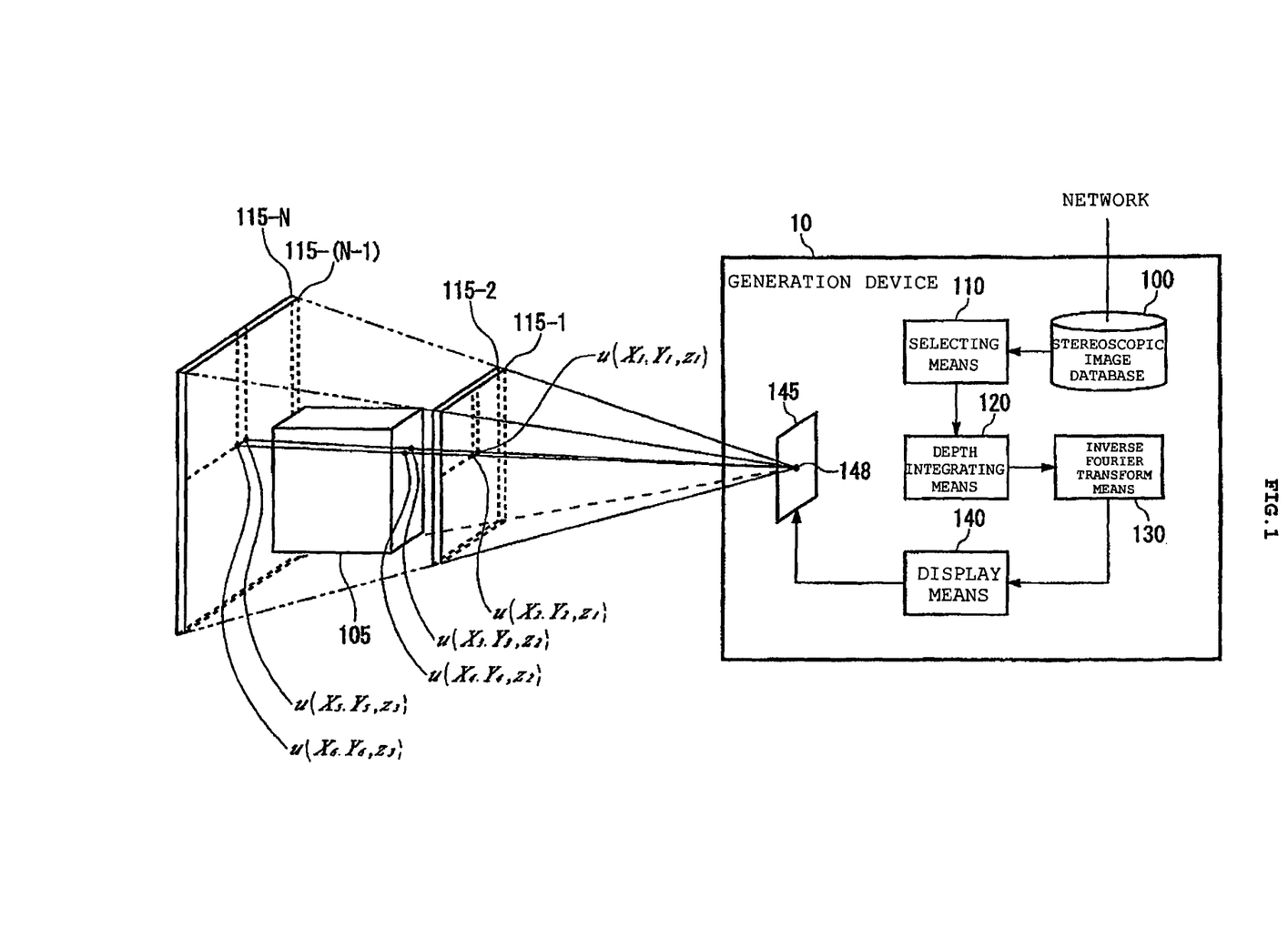
FIG. 1 is a diagram for explaining functional blocks and the concepts of functions of a generation device 10.

FIG. 1 is a diagram for explaining functional blocks and the concepts of functions of a generation device 10. The generation device 10 is a device which, based on a 3D object to be displayed as a diffraction pattern, generates and displays a hologram pattern for displaying the 3D object. Using the present drawing, a method in which the generation device 10 displays a hologram pattern on an LCD 145 in order to cause an observer to perceive a 3D object 105 will be described.

The generation device 10 includes a 3D object database 100, selecting means 110, depth integrating means 120, inverse Fourier transform means 130, display means 140, and the LCD 145 for displaying the hologram pattern. The 3D object database 100 acquires data representing the 3D object to be displayed from other device or the like communicating therewith through a network and stores the data. Instead of this, the 3D object database 100 may acquire data representing the 3D object to be displayed from a three-dimensional scanner for reading the shape of an object to be displayed and store the data. For example, the 3D object to be displayed is a 3D object which the observer perceives as the result of seeing the hologram pattern on the LCD 145.

The selecting means 110 acquires the data representing the 3D object to be displayed, e.g., data representing the shape or the like of the 3D object 105, from the 3D object database 100. Then, the selecting means 110 selects cross section ranges 115-1 to 115-N, which are ranges used for generating the hologram pattern, in a plurality of respective cross sections into which the 3D object 105 is divided and which are parallel to the LCD 145, and transmits information for identifying the cross section ranges 115-1 to 115-N to the depth integrating means 120.

Specifically, the selecting means 110 selects, as each of the cross section ranges 115-1 to 115-N in the respective cross sections, a range overlapping the cross section ranges in the other cross sections in the case where the relevant cross section is perspectively seen from a previously determined observation point 148 on the hologram pattern.

For each of a plurality of lattice points in a coordinate system provided in one cross section range, the depth integrating means 120 calculates a depth integral function acquired by integrating an inverse diffraction function for determining a hologram pattern for displaying points of the 3D object, with respect to the respective lattice points in the plurality of cross section ranges which overlap the relevant lattice point when the plurality of cross section ranges are perspectively seen from the observation point 148, and transmits the calculation result to the inverse Fourier transform means 130.

For example, for $u(X_1, Y_1, z_1)$, which is a lattice point in the cross section range 115-1, the depth integrating means 120 calculates, as a depth integral function, a function acquired by integrating the inverse diffraction function with respect to $u(X_3, Y_3, z_2)$, $u(X_5, Y_5, z_3)$, and the like, which are the lattice points in the respective cross section ranges 115-1 to 115-N that overlap $u(X_1, Y_1, z_1)$ in the case where the cross section ranges 115-1 to 115-N are perspectively seen from the observation point 148.

Moreover, for $u(X_2, Y_2, z_1)$, which is a lattice point in the cross section range 115-1, the depth integrating means 120 calculates, as a depth integral function, a function acquired by integrating the inversed if fraction function with respect to $u(X_4, Y_4, z_2)$, $u(X_6, Y_6, z_3)$, and the like, which are the lattice points in the respective cross section ranges 115-1 to 115-N that overlap $u(X_2, Y_2, z_1)$ in the case where the cross section ranges 115-1 to 115-N are perspectively seen from the observation point 148.

The inverse Fourier transform means 130 generates a hologram pattern by performing a two-dimensional inverse discrete Fourier transform, which is one example of a two-dimensional inverse Fourier transform, on the depth integral functions received from the depth integrating means 120, with respect to the plurality of lattice points in the one cross section range, e.g., with respect to $u(X_1, Y_1, z_1)$, $u(X_2, Y_2, z_1)$, and the like, and transmits the hologram pattern to the display means 140. In this way, the inverse Fourier transform means 130 performs an inverse Fourier transform once in order to generate one hologram pattern. This enables the generation device 10 to generate the hologram pattern fast.

Here, lattice points are, for example, points to be discretized in a two-dimensional inverse discrete Fourier transform performed by the inverse Fourier transform means 130.

The display means 140 displays the hologram pattern received from the inverse Fourier transform means 130 on the LCD 145. Thus, the LCD 145 can cause the observer to perceive the 3D object 105 as holography.

Figure 2:
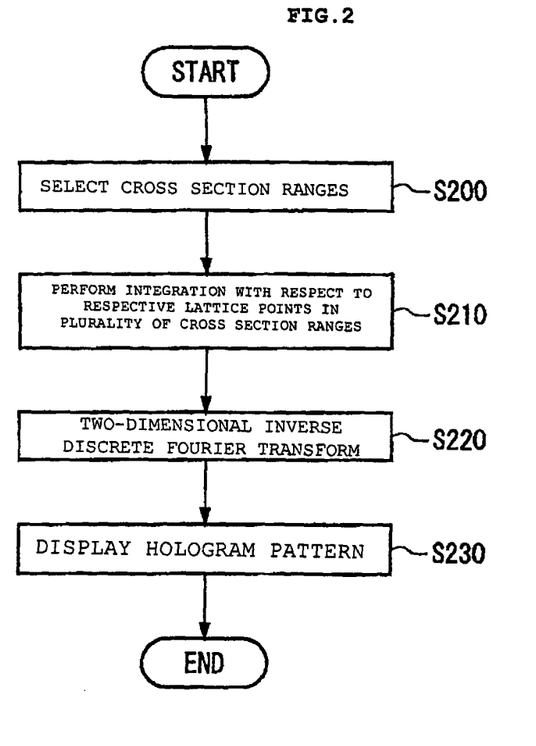
FIG. 2 shows an operation flow of the generation device 10.

FIG. 2 shows an operation flow of the generation device 10. The selecting means 110 selects the cross section ranges 115-1 to 115-N, which are ranges used for generating the hologram pattern, in the plurality of respective cross sections into which the 3D object 105 is divided and which are parallel to the LCD 145 (S200). This will be concretely described using the following procedure.

1. Periodicity of Hologram Pattern

The diffraction pattern $u(X, Y, z)$ reconstructed on the cross section at a distance z from the hologram pattern in the case where $h(x, y)$ representing the hologram pattern on a hologram H is perpendicularly irradiated with coherent light at a wavelength $\lambda$, is determined by the Fraunhofer diffraction integral function given by Eq. 1 below.

$$u(X, Y, z) = e^{ik\left(z + \frac{X^2+Y^2}{2z}\right)} \iint_H dx\, dy\, h(x, y) e^{-2\pi i(\xi x + \zeta y)} \Big|_{\xi=\frac{X}{\lambda z}, \zeta=\frac{Y}{\lambda z}} \quad \text{(Equation 1)}$$

where $k = 2\pi/\lambda$ and k represents the wave number of the light wave.

Using a Fourier transform, the integral on the right-hand side can be expressed as follows:

$$u(X, Y, z) = e^{ik\left(z + \frac{X^2+Y^2}{2z}\right)} F[h]\left(\frac{X}{\lambda z}, \frac{Y}{\lambda z}\right) \quad \text{(Equation 2)}$$

Moreover, since the display means 140 displays the hologram pattern using pixels arranged on the LCD 145, the hologram pattern $h(x, y)$ can be expressed as Eq. 3 below.

$$h(x, y) = \sum_{n,m} g_{n,m} \chi(x - n\Delta, y - m\Delta) \quad \text{(Equation 3)}$$

where $g_{n,m}$ represents the color displayed in the pixel at coordinates (n, m) on the LCD 145. Moreover, $\chi(x, y)$ represents the aperture function of each pixel. Furthermore, $\Delta$ represents the inter-pixel distance of the LCD 145 for displaying the hologram pattern.

Under the above conditions, $u(X, Y, z)$ representing the diffraction pattern is determined by Eq. 4 below.

$$u(X, Y, z) = e^{ik\left(z + \frac{X^2+Y^2}{2z}\right)} F[h]\left(\frac{X}{\lambda z}, \frac{Y}{\lambda z}\right) \quad \text{(Equation 4)}$$

$$= e^{ik\left(z + \frac{X^2+Y^2}{2z}\right)} F\left[\sum_{n,m} g_{n,m} \chi(x - n\Delta, y - m\Delta)\right]\left(\frac{X}{\lambda z}, \frac{Y}{\lambda z}\right)$$

$$= e^{ik\left(z + \frac{X^2+Y^2}{2z}\right)} \sum_{n,m} g_{n,m} F[\chi(x - n\Delta, y - m\Delta)]\left(\frac{X}{\lambda z}, \frac{Y}{\lambda z}\right)$$

$$= e^{ik\left(z + \frac{X^2+Y^2}{2z}\right)} \sum_{n,m} g_{n,m} e^{-2\pi i\left(n\frac{X\Delta}{\lambda z} + m\frac{Y\Delta}{\lambda z}\right)} F[\chi]\left(\frac{X}{\lambda z}, \frac{Y}{\lambda z}\right)$$

Here, Eq. 6 below is the Fourier transform of the aperture function and therefore represents the contrast of the entire plane on which the diffraction pattern is displayed. That is, Eq. 7 below is a term representing the shape of the diffraction pattern.

$$e^{ik\left(z + \frac{X^2+Y^2}{2z}\right)} \quad \text{(Equation 5)}$$

$$F[\chi]\left(\frac{X}{\lambda z}, \frac{Y}{\lambda z}\right) \quad \text{(Equation 6)}$$

$$G(X, Y) \equiv \sum_{n,m} g_{n,m} e^{-2\pi i\left(n\frac{X\Delta}{\lambda z} + m\frac{Y\Delta}{\lambda z}\right)} \quad \text{(Equation 7)}$$

Here, Eq. 7 is a Fourier series having $g_{n,m}$ as coefficients and therefore has periodicity of $\lambda z/\Delta$ for each of X and Y. That is, Eq. 4 as a whole, except for Eq. 5 representing the phase of the light wave and Eq. 6 representing the contrast of the entire plane, has periodicity of $\lambda z/\Delta$.

2. Determination of Hologram Pattern Using Inverse Function of Fraunhofer Diffraction Integral Function The hologram pattern $h(x, y)$ for displaying the diffraction pattern $u(X, Y, z)$ is determined by Eq. 8 below, which is the inverse function of the Fraunhofer diffraction integral function.

$$h(x, y) = \iint_H dX\, dY\, e^{ik\left(z + \frac{X^2+Y^2}{2z}\right)} u(X, Y, z) e^{-2\pi i(\alpha X + \beta Y)} \Big|_{\alpha=\frac{x}{\lambda z}, \beta=\frac{y}{\lambda z}} \quad \text{(Equation 8)}$$

Here, the inverse diffraction function according to the present invention is, for example, an integrand with respect to coordinate variables in Eq. 8, which is the inverse function of the Fraunhofer diffraction integral function.

Using an inverse Fourier transform, the integral on the right-hand side can be expressed as follows:

$$h(x, y) = F^{-1}\left[e^{ik\left(z + \frac{X^2+Y^2}{2z}\right)} u(X, Y, z)\right]\left(\frac{x}{\lambda z}, \frac{y}{\lambda z}\right) \quad \text{(Equation 9)}$$

3. Selection of Cross Section Ranges 115-1 to 115-N by Selecting Means 110

The selecting means 110 selects the cross section ranges 115-1 to 115-N by setting the integration interval in the inverse function of the Fraunhofer diffraction integral function to the period described in the foregoing "1. Periodicity of Hologram Pattern."

First, as expressed by Eqs. 10 and 11, in the inverse diffraction function of Eq. 8, the selecting means 110 performs a variable change from X and Y, which are coordinate variables representing coordinates in each of the plurality of cross sections, to the variables acquired by dividing X and Y by the distance to the relevant cross section.

$$\overline{X} = \frac{\Delta X}{\lambda z} \quad \text{(Equation 10)}$$

$$\overline{Y} = \frac{\Delta Y}{\lambda z} \quad \text{(Equation 11)}$$

Moreover, in Eq. 8, the selecting means 110 sets the integration interval with respect to the coordinate variables after the variable change, to the same previously determined interval, e.g., the interval of 0 to 1, for each of the cross section ranges 115-1 to 115-N. Therefore, Eq. 8 is modified into Eq. 12 below.

$$h(x, y) = \int\int_{[0,1]\times[0,1]} d\overline{X}d\overline{Y} e^{ikz\left(1+\frac{\Delta^2}{2}(\overline{X}^2+\overline{Y}^2)\right)}$$
$$u\left(\frac{\lambda z}{\Delta}\overline{X}, \frac{\lambda z}{\Delta}\overline{Y}, z\right)e^{-2\pi i\left(\alpha\frac{\lambda z}{\Delta}\overline{X}+\frac{\lambda z}{\Delta}\overline{Y}\right)}\Big|_{\alpha=\frac{x}{\lambda z},\beta=\frac{y}{\lambda z}}$$
$$= \int\int_{[0,1]\times[0,1]} d\overline{X}d\overline{Y} e^{ikz\left(1+\frac{\Delta^2}{2}(\overline{X}^2+\overline{Y}^2)\right)}$$
$$u\left(\frac{\lambda z}{\Delta}\overline{X}, \frac{\lambda z}{\Delta}\overline{Y}, z\right)e^{-2\pi i(\alpha\overline{X}+\beta\overline{Y})}\Big|_{\alpha=\frac{x}{\Delta},\beta=\frac{y}{\Delta}}$$

(Equation 12)

Note that a constant term concerning the entire equation is omitted here.

Therefore, the integration interval with respect to each of X and Y becomes the interval of 0 to λz/Δ. That is, the selecting means 110 selects, as each of the cross section ranges 115-1 to 115-N, a range having sides in the X and Y directions which are proportional to the distance from the LCD 145 to the relevant cross section and the wavelength of the light wave and inversely proportional to the inter-pixel distance of the LCD 145. Thus, the selecting means 110 can select the plurality of cross section ranges in the plurality of respective cross sections into which the 3D object 105 is divided and which are parallel to the LCD 145 such that the plurality of cross section ranges overlap when perspectively seen from the observation point 148 on the LCD 145.

Subsequently, for each of a plurality of lattice points in one cross section range, the depth integrating means 120 calculates a depth integral function acquired by integrating the inverse diffraction function for determining the hologram pattern for displaying points of the 3D object, with respect to the respective lattice points in the plurality of cross section ranges which overlap the relevant lattice point in the case where the plurality of cross section ranges are perspectively seen from the observation point 148 (S210).

A concrete example will be described. First, the present example is based on the premise that the LCD 145 has pixels arranged in N rows and N columns. Moreover, the depth integrating means 120 determines lattice points which overlap each other in the respective cross section ranges 115-1 to 115-N in the case where the cross section ranges 115-1 to 115-N are perspectively seen from the observation point 148, such that the lattice points are related to each of the pixels in the LCD 145. Thus, the inverse diffraction function representing the lattice points of the 3D object is given by Eq. 14. Note that the first and second terms of the integrand of Eq. 12, excluding the last exponential function, are omitted and expressed as Eq. 13.

$$\overline{u}^E(\overline{X}, \overline{Y}, z) \equiv e^{ikz\left(1+\frac{\Delta^2}{2}(\overline{X}^2+\overline{Y}^2)\right)} u\left(\frac{\lambda z}{\Delta}\overline{X}, \frac{\lambda z}{\Delta}\overline{Y}, z\right) \quad \text{(Equation 13)}$$

$$\overline{u}^E_{I,J}(z) \equiv \overline{u}^E\left(\frac{I}{N}, \frac{J}{N}, z\right) (I, J = 0, 1 \cdots, N-1) \quad \text{(Equation 14)}$$

Therefore, the depth integrating means 120 can determine the hologram pattern for displaying lattice points on one cross section of the 3D object, as the function represented by Eq. 15 below.

$$h_{i,j}(z) \equiv h\left(\frac{\Delta i}{N}, \frac{\Delta j}{N}\right) \quad \text{(Equation 15)}$$
$$= DF^{-1}[\overline{u}^E_{I,J}(z)] \quad (i, j = 0, 1 \ldots, N-1)$$

Here, the hologram pattern for displaying the 3D object can be generated by integrating Eq. 15 with respect to z. For example, Eq. 16 is calculated.

$$h_{i,j} \equiv \int dz DF^{-1}[\overline{u}^E_{I,J}(z)] \quad \text{(Equation 16)}$$
$$(i, j = 0, 1 \ldots, N-1)$$

However, in order to calculate Eq. 16 as it is, a two-dimensional inverse discrete Fourier transform needs to be performed a number of times corresponding to the number of cross sections. On the other hand, if the processing sequence of the two-dimensional inverse discrete Fourier transform and the integral with respect to z can be reversed, the number of times of processing the two-dimensional inverse discrete Fourier transform can be reduced to one. Accordingly, the computation time can be reduced.

Hereinafter, the reason why the processing sequence can be reversed will be described.

Eq. 12 determining the diffraction pattern represents the processing of performing a two-dimensional inverse Fourier transform on the expression u(X, Y, z) which determines the diffraction pattern and then integrating the result with respect to the variable z in the depth direction. Moreover, the two-dimensional inverse Fourier transform is an integral transform with respect to the coordinate variables after the variable change, and the integration interval thereof is 0 to 1. That is, since Eq. 12 is the integral of a cuboid region in the three-dimensional coordinate system after the variable change, the processing sequence of the two-dimensional inverse Fourier transform and the integrating processing can be reversed.

Here, in Eq. 16, a processing corresponding to the two-dimensional inverse Fourier transform in Eq. 12 is discretized and performed as a two-dimensional inverse discrete Fourier transform. Therefore, in Eq. 16, the processing sequence of the calculation of the series corresponding to the two-dimensional inverse discrete Fourier transform and the processing of integrating with respect to the variable z in the depth direction can be reversed. As a result, the depth integrating means 120 can perform the integral with respect to z before the two-dimensional inverse discrete Fourier transform for the expression u(x, Y, z) determining the diffraction pattern.

Furthermore, the depth integrating means 120 approximates the term (17) representing the phase of the light wave in the inverse diffraction function represented in Eq. 12 by a function independent of the coordinate variables, e.g., Eq. 18. Therefore, the depth integrating means 120 can perform the integral with respect to z before the two-dimensional inverse discrete Fourier transform also for the term representing the phase of the light wave.

$$e^{ikz\left(1+\frac{\Delta^2}{2}(X^2+Y^2)\right)} \quad \text{(Equation 17)}$$

$$e^{ikz} \quad \text{(Equation 18)}$$

Instead of the above, the depth integrating means 120 may approximate the term (17) representing the phase of the light wave by a periodic function having, as the period of the coordinate variables, the ratio of the coordinate variables before the variable change to the coordinate variables after the variable change, e.g., a periodic function having a predetermined value with period $\lambda z/\Delta$. This approximation also enables the depth integrating means 120 to integrate the inverse diffraction function with respect to z prior to the two-dimensional inverse discrete Fourier transform.

As described above, the depth integrating means 120 can calculate the depth integral function by integrating the inverse diffraction function in which the variable change has been performed, with respect to the variable z representing the distance from the hologram pattern to a cross section.

Subsequently, the inverse Fourier transform means 130 performs a two-dimensional inverse discrete Fourier transform on the depth integral functions with respect to a plurality of lattice points in one cross section range for the coordinate variables after the variable change (S220). Thus, the inverse Fourier transform means 130 can generate the hologram pattern. The procedures of S210 and S220 are represented by Eq. 19.

$$h_{i,j}=DF^{-1}[\int dzu^{-E}_{I,J}(z)] \ (i,j=0, 1 \ldots, N-1) \quad \text{(Equation 19)}$$

Then, the display means 140 displays the hologram pattern generated by the inverse Fourier transform means 130 on the LCD 145 (S230).

As described above in the present embodiment, the generation device 10 executes the integrating processing with respect to a variable representing the distance from the diffraction pattern to be displayed to the hologram pattern before the two-dimensional inverse discrete Fourier transform by appropriately determining the integration interval of the inverse diffraction function and the granularity of discretization. Thus, the number of times of a two-dimensional inverse discrete Fourier transform can be drastically reduced.

Figure 3:
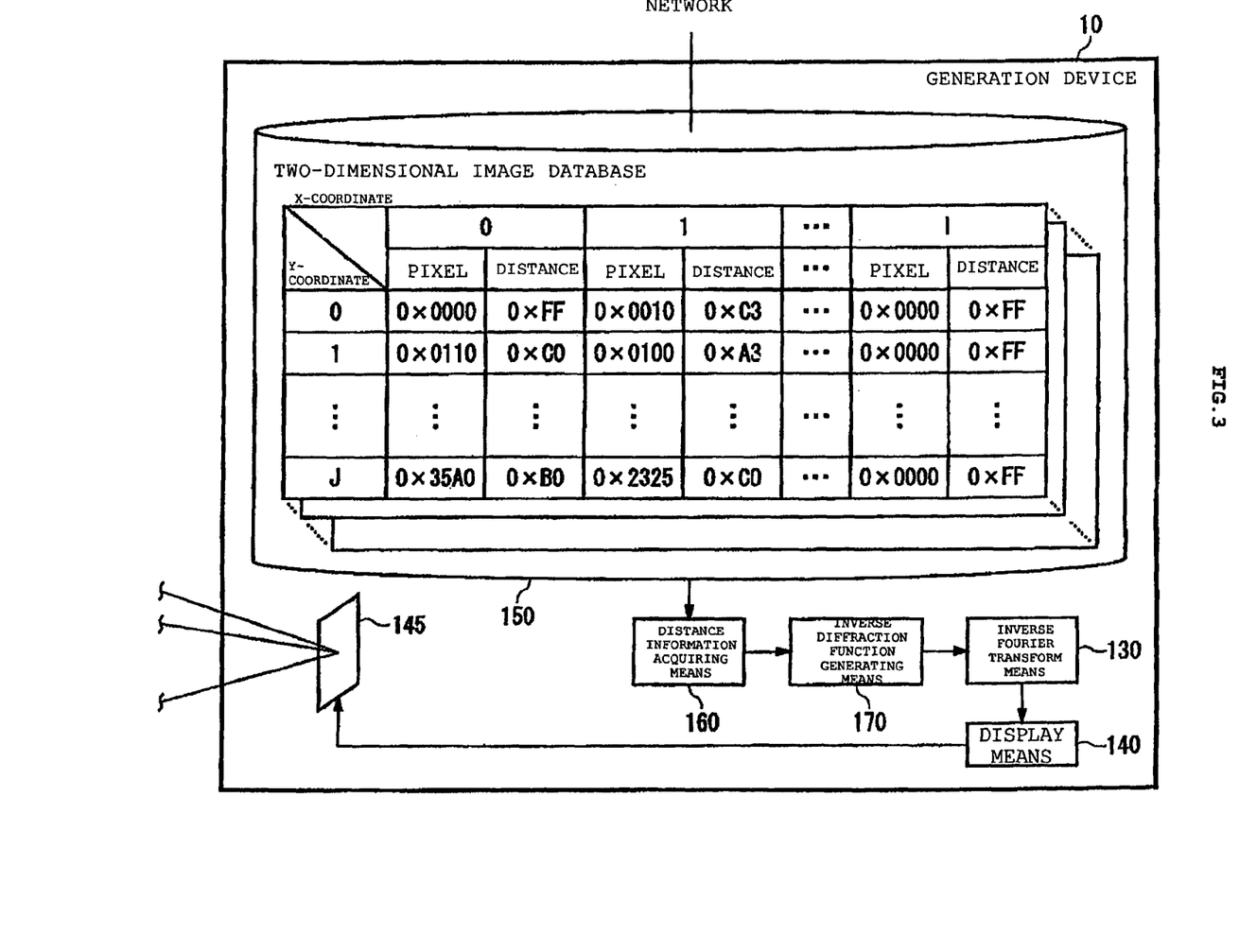
FIG. 3 shows a block diagram of a generation device 10 in a modified example.

FIG. 3 shows a block diagram of a generation device 10 in a modified example. The generation device 10 in the present example has a two-dimensional image database 150, distance information acquiring means 160, and inverse diffraction function generating means 170 in addition to the components of the generation device 10 of FIG. 1. Moreover, the generation device 10 in the present example does not have to include the 3D object database 100, the selecting means 110, and the depth integrating means 120.

The two-dimensional image database 150 stores information representing each pixel of a two-dimensional image acquired by projecting the 3D object to be displayed as a diffraction pattern onto a predetermined plane such that the information is associated with distance information representing the distance from the relevant pixel to a portion of the 3D object recorded as the relevant pixel. Moreover, the two-dimensional image database 150 may acquire the two-dimensional image from other device communicating therewith through a network.

For example, the two-dimensional image database 150 may store a two-dimensional image in conformity with the OpenGL standard, which is an API for processing graphics. In this case, the two-dimensional image database 150 stores data in the z-buffer conforming to the OpenGL standard as the distance information. To be more precise, for the pixel having (X-coordinate, Y-coordinate)=(1, 0) of the two-dimensional image, the two-dimensional image database 150 stores 0x0010 representing colors or the like of the relevant pixel as information representing the relevant pixel and 0xC3 as the distance information of the relevant pixel. Note that the two-dimensional image database 150 may store a two-dimensional image having a data size compressed by a predetermined processing.

Then, the distance information acquiring means 160 acquires the information representing each pixel of the relevant two-dimensional image from the two-dimensional image database 150 such that the information is associated with the distance information of the relevant pixel, and transmits the acquired information to the inverse diffraction function generating means 170. For each pixel of the two-dimensional image, the inverse diffraction function generating means 170 generates an inverse diffraction function for determining a hologram pattern for displaying a portion of the 3D object recorded as the relevant pixel, based on the distance information at the relevant pixel, and transmits the inverse diffraction function to the inverse Fourier transform means 130.

The inverse Fourier transform means 130 generates a hologram pattern by performing a two-dimensional inverse discrete Fourier transform on the received inverse diffraction functions with respect to variables representing the coordinates of the two-dimensional image, and transmits the hologram pattern to the display means 140. The display means 140 displays the received hologram pattern on the LCD 145.

Figure 4:
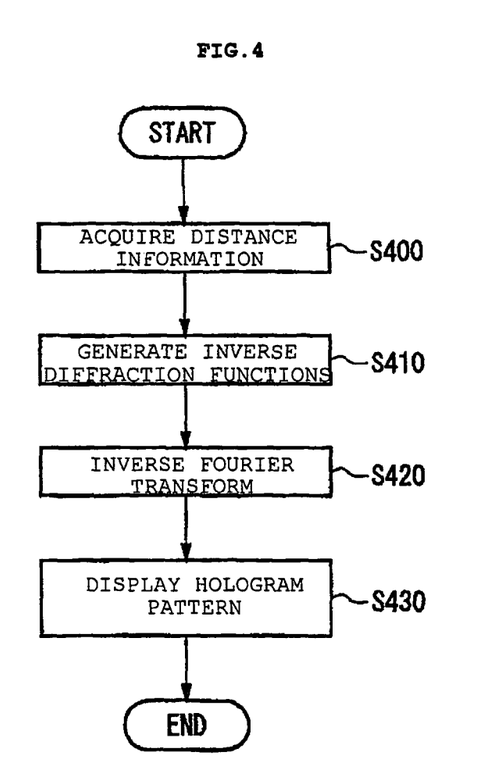
FIG. 4 shows an operation flow of the generation device 10 in the modified example.

FIG. 4 shows an operation flow of the generation device 10 in the modified example. The distance information acquiring means 160 acquires distance information for each pixel of a two-dimensional image acquired by projecting a 3D object to be displayed as a diffraction pattern onto a predetermined plane (S400). Then, for each pixel of the two-dimensional image, the inverse diffraction function generating means 170 generates an inverse diffraction function for determining the hologram pattern for displaying a portion of the 3D object recorded as the relevant pixel, based on the distance information at the relevant pixel (S410).

For example, the inverse diffraction function is an integrand in the inverse function of the Fraunhofer diffraction integral function. In this case, the inverse diffraction function generating means 170 generates the term representing the phase of the light wave in the relevant inverse diffraction function based on the distance information.

The inverse Fourier transform means 130 generates the hologram pattern by performing a two-dimensional inverse discrete Fourier transform on the inverse diffraction functions with respect to variables representing coordinates of the two-dimensional image (S420). The display means 140 displays the hologram pattern on the LCD 145 (S430).

As described above, according to the present modified example, the generation device 10 can generate a hologram pattern based on an existing two-dimensional image in conformity with the OpenGL standard or the like. Thus, a user can easily make the existing two-dimensional image three-dimensional. Moreover, similar to the generation device 10 in the embodiment, the generation device 10 can generate a hologram pattern very fast by performing two-dimensional inverse discrete Fourier transform once.

Figure 5:
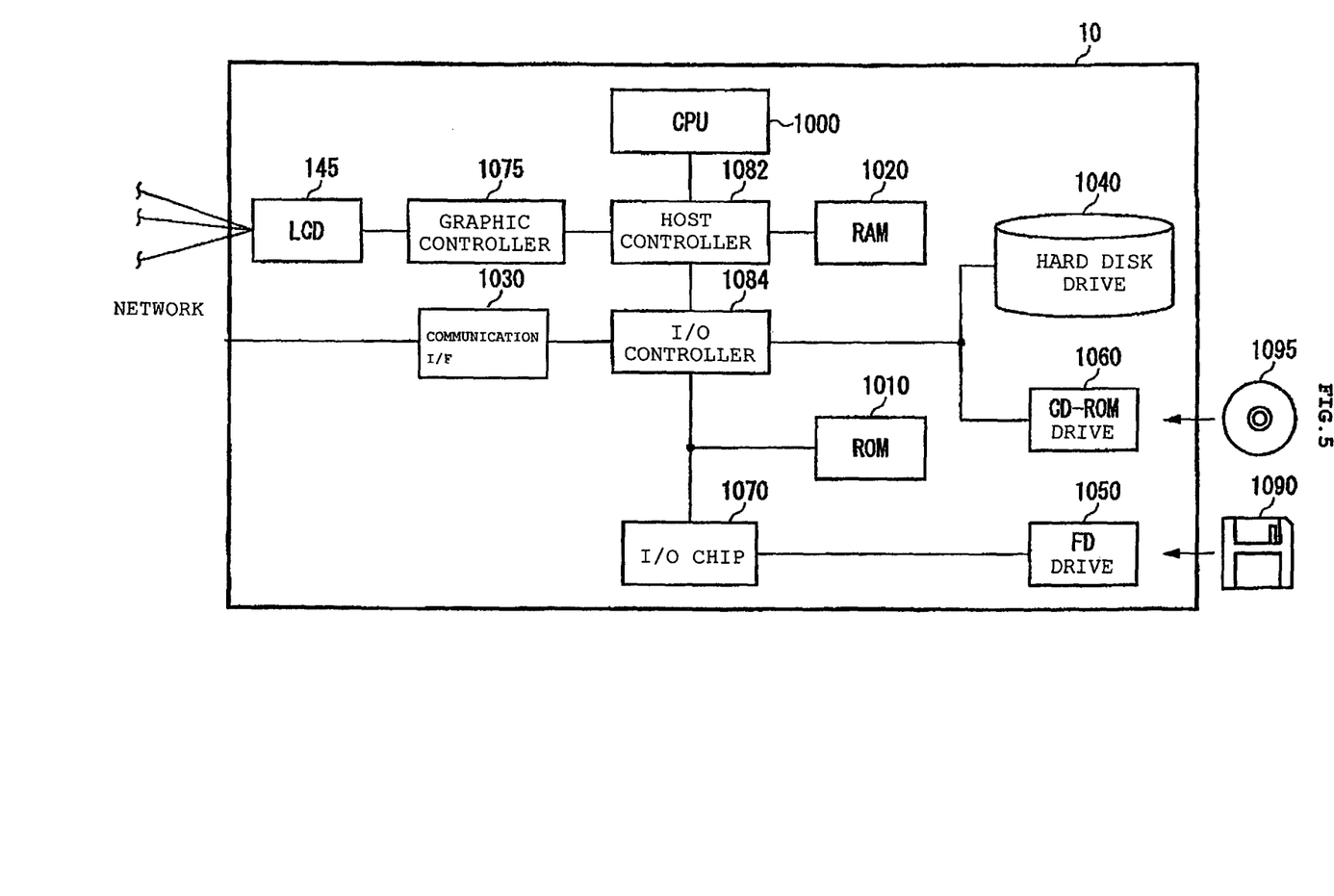
FIG. 5 shows one example of the hardware configuration of the generation device 10 in the embodiment or the modified example.

FIG. 5 shows one example of the hardware configuration of the generating device 10 in the embodiment or the modified example. The generation device 10 includes a CPU peripheral section having a CPU 1000, a RAM 1020, a graphic controller 1075, and an LCD 145 which are connected to each other through a host controller 1082; an input/output section having a communication interface 1030, a hard disk drive 1040, and a CD-ROM drive which are connected to the host controller 1082 through an input/output controller 1084; and a legacy input/output section having a ROM 1010, a floppy disk drive 1050, and an input/output chip 1070 which are connected to the input/output controller 1084.

The host controller 1082 connects the RAM 1020 with the CPU 1000 and the graphic controller 1075 which access the RAM 1020 at high transfer rates. The CPU 1000 performs an operation based on programs stored in the ROM 1010 and the RAM 1020 and controls each unit. The graphic controller 1075 acquires image data which the CPU 1000 or the like generates on a frame buffer provided in the RAM 1020, and displays the image data on the LCD 145. Instead of this, the graphic controller 1075 may include a frame buffer inside, which stores image data generated by the CPU 1000 or the like.

The input/output controller 1084 connects the host controller 1082 with the communication interface 1030, the hard disk drive 1040, and the CD-ROM drive 1060, which are relatively fast input/output devices. The communication interface 1030 communicates with an external device through a network. The hard disk drive 1040 stores programs and data used by the generation device 10. The CD-ROM drive 1060 reads a program or data from the CD-ROM 1095, and provides the program or the data for the input/output chip 1070 through the RAM 1020.

Moreover, the ROM 1010 and the floppy disk drive 1050, the input/output chip 1070, and the like, which are relatively slow input/output devices, are connected to the input/output controller 1084. The ROM 1010 stores a boot program executed by the CPU 1000 when the generation device 10 is started, and a program dependent on the hardware of the generation device 10 and the like. The floppy disk drive 1050 reads a program or data from the floppy disk 1090, and provides the program or the data for the input/output chip 1070 through the RAM 1020. The input/output chip 1070 is connected to the floppy disk 1090 and various kinds of input/output devices through, for example, a parallel port, a serial port, a keyboard port, a mouse port, and the like.

A program provided to the generation device 10 is provided by a user, in a state of being stored on a recording medium, such as the floppy disk 1090, the CD-ROM 1095, an IC card, or the like. The program is read from the recording medium through the input/output chip 1070 and/or the input/output controller 1084, and installed on the generation device 10 to be executed.

The program installed and executed on the generation device 10 includes a selecting module, a depth integrating module, an inverse Fourier transform module, and a display module. The operation which each module actuates the generation device 10 to perform is the same as that of the corresponding member in the generation device 10 described in FIGS. 1 to 4. Therefore, a description thereof will be omitted.

The above-described programs and modules may be stored on an external recording medium. In addition to the floppy disk 1090 and the CD-ROM 1095, optical recording media including DVDs and PDs, magneto-optical recording media including MDs, tape media, semiconductor memories including IC cards, and the like can be used as the recording medium. Moreover, a program may be provided to the generation device 10 through a network using, as the recording medium, a storage device such as a hard disk drive or a RAM, which is provided on a server system connected to a dedicated communication network or the Internet.

As apparent from the above description, the generation device 10 can generate a hologram pattern for displaying a desired 3D object fast. Specifically, the generation device 10 widely sets the integration interval of an inverse diffraction function for determining a hologram pattern for displaying one point of the 3D object, depending on the distance between the hologram pattern and a cross section of the 3D object. Thus, the generation device 10 reverses the processing sequence of an integrating processing and an inverse Fourier transform to reduce the number of times of an inverse Fourier transform.

Moreover, the generation device 10 has a high affinity for known standards. Specifically, the generation device 10 can generate a hologram pattern for displaying a two-dimensional image in conformity with the OpenGL standard as a 3D object.

Thus, the generation device 10 can generate a hologram pattern very fast compared with a known device. This makes it possible to realize moving image reconstruction by holography using a computer having realistic computing power.

Although the present invention has been described above using the embodiment, the technical scope of the present invention is not limited to the scope of the description of the above embodiment. It is apparent to those skilled in the art that various modifications and improvements can be made in the above embodiment. From the description of the claims, it is apparent that aspects in which such modifications and improvements are made can also be included in the technical scope of the present invention.

According to the above embodiment and modified example, a generation device, a generation method, a program, a recording medium described in the following respective items can be realized.

(Article 1) A generation device for generating a hologram pattern for displaying a 3D object based on the 3D object to be displayed, the generation device including:

selecting means for selecting, as a cross section range in each cross section of a plurality of cross sections into which the 3D object is divided and which are parallel to the hologram pattern, the cross section range being a range used for generating the hologram pattern, a cross section range overlapping cross section ranges in other cross sections in a case where the relevant cross section is perspectively seen from a previously determined observation point on the hologram pattern;

depth integrating means for calculating, for each of a plurality of lattice points in a coordinate system provided in one cross section range, a depth integral function acquired by integrating an inverse diffraction function for determining a hologram pattern for displaying points of the 3D object, with respect to respective lattice points in the plurality of cross section ranges, the respective lattice points overlapping the relevant lattice point in a case where the plurality of cross section ranges are perspectively seen from the observation point; and inverse Fourier transform means for generating the hologram pattern by performing a two-dimensional inverse Fourier transform on the depth integral functions with respect to the plurality of lattice points in the one cross section range.

(Article 2) The generation device according to Article 1, wherein the selecting means selects the plurality of cross section ranges by performing a variable change from coordinate variables representing coordinates on each of the plurality of cross sections to variables acquired by dividing the coordinate variables by a distance to the relevant cross section, the depth integrating means calculates the depth integral function by integrating the inverse diffraction function in which the variable change has been performed, with respect to a variable representing a distance from the hologram pattern to a cross section, and the inverse Fourier transform means performs the two-dimensional inverse Fourier transform with respect to the plurality of lattice points by performing an inverse Fourier transform on the depth integral functions with respect to the coordinate variables in which the variable change has been performed.

(Article 3) The generation device according to Article 2, wherein the inverse diffraction function is an integrand with respect to the coordinate variables in an inverse function of the Fraunhofer diffraction integral function, and the selecting means selects the plurality of cross section ranges by performing a variable change on the coordinate variables of the integrand and setting an integration interval with respect to the coordinate variables to a same previously determined interval for the plurality of cross section ranges in the inverse function of the Fraunhofer diffraction integral function.

(Article 4) The generation device according to Article 2, wherein the depth integrating means performs integration with respect to the variable representing the distance from the hologram pattern to a cross section by approximating a term representing a phase component of a light wave in the inverse diffraction function by a value independent of the coordinate variables.

(Article 5) The generation device according to Article 2, wherein the depth integrating means performs integration with respect to the variable representing the distance from the hologram pattern to a cross section by approximating a term representing a phase component of a light wave in the inverse diffraction function by a periodic function having, as a period of the coordinate variables, a ratio of the coordinate variables before the variable change to the coordinate variables after the variable change.

(Article 6) The generation device according to Article 1, further comprising display means for displaying the hologram pattern generated by the inverse Fourier transform means.

(Article 7) The generation device according to Article 1, wherein the selecting means selects, as each of the plurality of cross section ranges, a range having one side which is proportional to a distance from the hologram pattern to the relevant cross section range and a wavelength of a light wave and inversely proportional to an inter-pixel distance of the hologram pattern.

(Article 8) A generation device for generating a hologram pattern, including:

distance information acquiring means for acquiring, for each pixel of a two-dimensional image acquired by projecting a 3D object to be displayed onto a predetermined plane, distance information representing a distance from the relevant pixel to a portion of the 3D object, the portion being recorded as the relevant pixel;

inverse diffraction function generating means for generating, for each pixel of the two-dimensional image, an inverse diffraction function for determining a hologram pattern for displaying a portion of the 3D object recorded as the relevant pixel, based on the distance information at the relevant pixel; and inverse Fourier transform means for generating the hologram pattern by performing a two-dimensional inverse Fourier transform on the inverse diffraction functions with respect to variables representing coordinates in the two-dimensional image.

(Article 9) A method of generating a hologram pattern using a computer, the hologram pattern displaying a 3D object based on the 3D object to be displayed, the method including the steps of:

selecting, as a cross section range in each cross section of a plurality of cross sections into which the 3D object is divided and which are parallel to the hologram pattern, the cross section range being a range used for generating the hologram pattern, a cross section range overlapping cross section ranges in other cross sections in a case where the relevant cross section is perspectively seen from a previously determined observation point on the hologram pattern, using the computer;

calculating, for each of a plurality of lattice points in a coordinate system provided in one cross section range, a depth integral function using the computer, the depth integral function being acquired by integrating an inverse diffraction function for determining a hologram pattern for displaying points of the 3D object, with respect to respective lattice points in the plurality of cross section ranges, the respective lattice points overlapping the relevant lattice point in a case where the plurality of cross section ranges are perspectively seen from the observation point; and generating the hologram pattern using the computer, by performing a two-dimensional inverse Fourier transform on the depth integral functions with respect to the plurality of lattice points in the one cross section range.

(Article 10) A method of generating a hologram pattern using a computer, including the steps of:

acquiring, for each pixel of a two-dimensional image acquired by projecting a 3D object to be displayed onto a predetermined plane, distance information using the computer, the distance information representing a distance from the relevant pixel to a portion of the 3D object, the portion being recorded as the relevant pixel;

generating, for each pixel of the two-dimensional image, an inverse diffraction function for determining a hologram pattern for displaying a portion of the 3D object recorded as the relevant pixel, based on the distance information at the relevant pixel using the computer; and generating the hologram pattern using the computer, by performing a two-dimensional inverse Fourier transform on the inverse diffraction functions with respect to variables representing coordinates in the two-dimensional image.

(Article 11) A program for generating, using a computer, a hologram pattern for displaying a 3D object based on the 3D object to be displayed, the program causing the computer to function as:

selecting means for selecting, as a cross section range in each cross section of a plurality of cross sections into which the 3D object is divided and which are parallel to the hologram pattern, the cross section range being a range used for generating the hologram pattern, a cross section range overlapping cross section ranges in other cross sections in a case where the relevant cross section is perspectively seen from a previously determined observation point on the hologram pattern;

depth integrating means for calculating, for each of a plurality of lattice points in a coordinate system provided in one cross section range, a depth integral function acquired by integrating an inverse diffraction function for determining a hologram pattern for displaying points of the 3D object, with respect to respective lattice points in the plurality of cross section ranges, the respective lattice points overlapping the relevant lattice point in a case where the plurality of cross section ranges are perspectively seen from the observation point; and inverse Fourier transform means for generating the hologram pattern by performing a two-dimensional inverse Fourier transform on the depth integral functions with respect to the plurality of lattice points in the one cross section range.

(Article 12) A program for generating a hologram pattern using a computer, the program causing the computer to function as:

distance information acquiring means for acquiring, for each pixel of a two-dimensional image acquired by projecting a 3D object to be displayed onto a predetermined plane, distance information representing a distance from the relevant pixel to a portion of the 3D object, the portion being recorded as the relevant pixel;

inverse diffraction function generating means for generating, for each pixel of the two-dimensional image, an inverse diffraction function for determining a hologram pattern for displaying a portion of the 3D object recorded as the relevant pixel, based on the distance information at the relevant pixel; and inverse Fourier transform means for generating the hologram pattern by performing a two-dimensional inverse Fourier transform on the inverse diffraction functions with respect to variables representing coordinates in the two-dimensional image.

(Article 13) A recording medium on which the program according to any one of Articles 11 and 12 is recorded.

According to the present invention, a hologram pattern can be generated fast. Although particular embodiments of the present invention have been described in detail, it should be understood that various changes, substitutions and alternations can be made therein without departing from spirit and scope of the inventions as defined by the appended claims.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer generation device for generating hologram pattern information for producing on a hologram display surface a holographic image of a 3D object, the generation device comprising:

a selector for acquiring object information and for selecting a first cross-section range comprising a plurality of cross sections into which image data of the 3D object is divided and which are parallel to the hologram display surface, and at least one additional cross section range, each additional cross section range overlapping a preceding cross section range along a line of perspective from a previously determined observation point on the hologram display surface;

depth integrating component for calculating, for each of a plurality of lattice points in a coordinate system provided in a selected cross section range, a depth integral function acquired by integrating an inverse diffraction function used for determining points for displaying the image of the 3D object, with respect to respective lattice points in the at least one additional cross section range, the respective lattice points overlapping a preceding lattice point along a line of perspective from the previously determined observation point; and inverse Fourier transform component for generating the hologram pattern by performing a two-dimensional inverse Fourier transform on the depth integral functions for the plurality of lattice points in the selected cross section range, said hologram pattern being and displaying the holographic image on the hologram display surface using the generated hologram pattern.

2. The generation device according to claim 1, wherein the selector selects cross section ranges by changing variables from coordinate variables representing coordinates on each of the plurality of cross sections to variables acquired by dividing the coordinate variables by a distance to the selected cross section, the depth integrating component calculates the depth integral function by integrating the inverse diffraction function in which the variable change has been performed, for a variable representing a distance from an edge of the hologram pattern to a cross section, and the inverse Fourier transform component performs the two-dimensional inverse Fourier transform with respect to the plurality of lattice points by performing an inverse Fourier transform on the depth integral functions for the coordinate variables in which the variable change has been performed.

3. The generation device according to claim 2, wherein the inverse diffraction function is an integrand with respect to the coordinate variables in an inverse function of the Fraunhofer diffraction integral function, and the selector selects the plurality of cross section ranges by changing coordinate variables of the integrand and setting an integration interval for the coordinate variables to a same previously determined interval for the plurality of cross section ranges in the inverse function of a Fraunhofer diffraction integral function.

4. The generation device according to claim 2, wherein the depth integrating component performs integration for the variable representing the distance from an edge of a display area of the hologram display surface to a cross section by approximating a term representing a phase component of a light wave to be used to display the holographic image in the inverse diffraction function by a value independent of the coordinate variables.

5. The generation device according to claim 2, wherein the depth integrating component performs integration for the variable representing the distance from an edge of a display area of the hologram display surface to a cross section by approximating a term representing a phase component of a light wave to be used to display the holographic image in the inverse diffraction function by a periodic function having, as a period of the coordinate variables, a ratio of the coordinate variables before the variable change to the coordinate variables after the variable change.

6. The generation device according to claim 1, wherein the selector selects, as each of the first and at least one cross section ranges, a range having one side which is proportional to an expected distance from an edge of a display area of the hologram display surface to the relevant cross section range and a wavelength of a light wave to be used to display the holographic image and inversely proportional to an expected inter-pixel distance of the holographic image to be produced.

7. The device of claim 1 wherein said object image information comprises two-dimensional image data and wherein said selecting cross section ranges comprises selecting pixels of said two-dimensional image.

8. A computer-implemented method for generating information for producing on a hologram display surface a holographic image of a 3D object, the method comprising the steps of:

acquiring object information for said 3D object;

selecting a first cross-section range comprising a plurality of cross sections into which image data of the 3D object is divided and which are parallel to the hologram display surface and at least one additional cross section range, each additional cross section range overlapping a preceding cross section range along a line of perspective from a previously determined observation point on the hologram display surface pattern, using the computer;

calculating, for each of a plurality of lattice points in a coordinate system provided in a selected cross section range, a depth integral function using the computer, the depth integral function being acquired by integrating an inverse diffraction function used for determining points for displaying the 3D object, with respect to respective lattice points in the at least one additional cross section range, the respective lattice points overlapping a preceding lattice point along a line of perspective from the previously determined observation point;

generating the hologram pattern, using the computer, by performing a two-dimensional inverse Fourier transform on the depth integral functions for the plurality of lattice points in the selected cross section range; and displaying the holographic image on the hologram display surface using the generated hologram pattern.

9. The method of claim 8 wherein said object image information comprises two-dimensional image data and wherein said selecting cross section ranges comprises selecting pixels of said two-dimensional image.

10. A program storage device readable by computer, tangibly storing a program of instructions executable by the computer to perform method steps for generating hologram pattern data for producing on a hologram display surface a holographic image of a 3D object the method comprising the steps of:

acquiring object information for said 3D object;

selecting a first cross-section range comprising a plurality of cross sections into which image data of the 3D object is divided and which are parallel to the hologram display surface and at least one additional cross section range, each additional cross section range overlapping a preceding cross section range along a line of perspective from a previously determined observation point on the hologram display surface pattern, using the computer;

calculating, for each of a plurality of lattice points in a coordinate system provided in a selected cross section range, a depth integral function using the computer, the depth integral function being acquired by integrating an inverse diffraction function used for determining points for displaying the 3D object, with respect to respective lattice points in the at least one additional cross section range, the respective lattice points overlapping a preceding lattice point along a line of perspective from the previously determined observation point;

generating the hologram pattern, using the computer, by performing a two-dimensional inverse Fourier transform on the depth integral functions for the plurality of lattice points in the selected cross section range; and displaying the holographic image on the hologram display surface using the generated hologram pattern.

11. The program storage device of claim 10 wherein said object image information comprises two-dimensional image data and wherein said selecting cross section ranges comprises selecting pixels of said two-dimensional image.

* * * * *